US012243410B2

(12) United States Patent
Shyu et al.

(10) Patent No.: US 12,243,410 B2
(45) Date of Patent: Mar. 4, 2025

(54) PERSONAL PROTECTIVE EQUIPMENT COMPLIANCE AND PERSONAL WELLNESS MONITORING SYSTEM WITH INTELLIGENT CONNECTED FACESHIELDS

(71) Applicant: Eaton Intelligent Power Limited, Dublin (IE)

(72) Inventors: Brian Shyu, McKees Rock, PA (US); Justin Adleff, Gibsonia, PA (US); Chris Henley, Pittsburg, PA (US); Srinivas Surya Katya Kanaka Garimella, Pittsburgh, PA (US); Keith Nolan, Westmeath (IE); Daniel Zucchetto, Dublin (IE); Julia O'Connell, Dublin (IE)

(73) Assignee: Eaton Intelligent Power Limited, Dublin (IE)

( * ) Notice: Subject to any disclaimer, the term of this patent is extended or adjusted under 35 U.S.C. 154(b) by 49 days.

(21) Appl. No.: 18/247,998

(22) PCT Filed: Oct. 5, 2021

(86) PCT No.: PCT/EP2021/025384
§ 371 (c)(1),
(2) Date: Apr. 5, 2023

(87) PCT Pub. No.: WO2022/073638
PCT Pub. Date: Apr. 14, 2022

(65) Prior Publication Data

US 2023/0377448 A1 Nov. 23, 2023

Related U.S. Application Data

(60) Provisional application No. 63/087,654, filed on Oct. 5, 2020.

(51) Int. Cl.
*G08B 25/01* (2006.01)
*G08B 21/02* (2006.01)
(Continued)

(52) U.S. Cl.
CPC .......... *G08B 25/016* (2013.01); *G08B 21/02* (2013.01); *G08B 21/22* (2013.01); *G08B 25/10* (2013.01); *H04B 17/318* (2015.01)

(58) Field of Classification Search
CPC ...... G08B 25/016; G08B 21/02; G08B 21/22; G08B 25/10; H04B 17/318
(Continued)

(56) References Cited

U.S. PATENT DOCUMENTS 6,868,360 B1 3/2005 Olstad
9,848,666 B1 * 12/2017 Egeland ............... A42B 3/0466
(Continued)

FOREIGN PATENT DOCUMENTS

GB 2571118 A 8/2019
WO WO 2016110804 A1 7/2016

OTHER PUBLICATIONS

International Search Report and Written Opinion for International Application No. PCT/EP2021/025384 mailed on Jan. 24, 2022, 14 pages, Jan. 24, 2022.

*Primary Examiner* — Zhen Y Wu
(74) *Attorney, Agent, or Firm* — Baker Botts L.L.P.

(57) ABSTRACT

Monitoring systems and methods incorporating wearable personal protection items such as headgear and faceshields equipped with intelligent sensor units configured to communicate with one another and simultaneously monitor personal wellness and safety protocol compliance across a community of persons.

20 Claims, 10 Drawing Sheets

(51) Int. Cl.
*G08B 21/22* (2006.01)
*G08B 25/10* (2006.01)
*H04B 17/318* (2015.01)

(58) Field of Classification Search
USPC .......................................................... 340/573.1
See application file for complete search history.

(56) References Cited

U.S. PATENT DOCUMENTS

| | | | | |
|---|---|---|---|---|
| 9,871,692 | B1* | 1/2018 | Hutz | H04W 4/02 |
| 10,497,224 | B2* | 12/2019 | Lee | G08B 21/0407 |
| 2010/0188187 | A1* | 7/2010 | Mughal | H01H 85/24<br>337/225 |
| 2011/0227700 | A1* | 9/2011 | Hamerly | G21F 3/02<br>340/10.1 |
| 2017/0206534 | A1* | 7/2017 | O'Brien | A41D 1/002 |
| 2017/0372216 | A1 | 12/2017 | Awiszus | |
| 2018/0012470 | A1* | 1/2018 | Kritzler | G06Q 50/265 |
| 2018/0020194 | A1* | 1/2018 | Kim | H04N 7/188 |
| 2018/0211345 | A1* | 7/2018 | Bean | G01S 11/06 |
| 2019/0073618 | A1* | 3/2019 | Kanukurthy | G08B 21/02 |
| 2019/0180594 | A1 | 6/2019 | Williams | |
| 2019/0333178 | A1* | 10/2019 | Cheng | G06Q 50/265 |
| 2020/0273313 | A1* | 8/2020 | Stinson | G08B 21/14 |
| 2020/0410444 | A1* | 12/2020 | Bohannon | G06Q 10/0875 |
| 2021/0216773 | A1* | 7/2021 | Bohannon | G06V 20/20 |
| 2022/0215496 | A1* | 7/2022 | Billingsley | G06Q 10/00 |
| 2022/0249032 | A1* | 8/2022 | Devarasetty | A61B 5/165 |
| 2022/0343905 | A1* | 10/2022 | Boxall | H04W 12/65 |

* cited by examiner

PERSONAL PROTECTIVE EQUIPMENT COMPLIANCE AND PERSONAL WELLNESS MONITORING SYSTEM WITH INTELLIGENT CONNECTED FACESHIELDS

BACKGROUND OF THE INVENTION

The field of the invention relates generally to computer-implemented personal protective equipment monitoring systems, and more specifically to personal protective equipment monitoring systems including intelligent wearable personal protective equipment items such as faceshields that are configured to wirelessly communicate with one another, assess personal wellness of the wearer, and detect non-compliance with personal protective equipment protocols.

A variety of different types of Personal Protective Equipment (PPE) exist that workers are required to use in a host of healthcare, industrial, utility, and professional trades to provide a degree of protection to workers from known risks in hazardous environments. Enhanced worker safety in otherwise hazardous environments can be desirably realized when PPE is utilized with appropriate and detailed safety protocols defining the specific items of PPE (e.g., protective suit, faceshield, gloves, etc.) and also for the proper use thereof in certain environments or for performing certain tasks within such environments.

Effectively overseeing the proper use of PPE by personnel in a hazardous environment presents practical challenges. While conscientious and well-trained workers typically follow PPE protocols successfully, some degree of inattentiveness and mistake is inevitable across a large population of workers performing tasks over an extended period of time, with potentially severe consequences. Also, the personal wellness of workers may contribute to success or failure to comply with protocols to safely complete tasks, as unwell workers may be more prone to distraction and mistake. In some cases, personal wellness may be part of the safety protocols in place to discourage unhealthy employees from performing certain tasks, but to some extent a worker's personal wellness is entirely subjective and workers may therefore not be cognizant of health issues or may overestimate their ability to overcome them. Achieving a healthy workforce and compliance with applicable PPE protocols is therefore an ongoing concern from the safety perspective, and intentional or unintentional violations of PPE protocols that compromise the desired safety protocols can often be difficult to detect across a number of workers in different areas performing different tasks.

Computer-implemented monitoring systems exist that intelligently incorporate sensors in items of PPE to create a degree of situational awareness of risks posed to groups of workers, but known systems of this type generally lack capability to detect specific PPE compliance issues and wellness issues associated with particular individuals in the group. Improvements are therefore desired.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Figure 1:
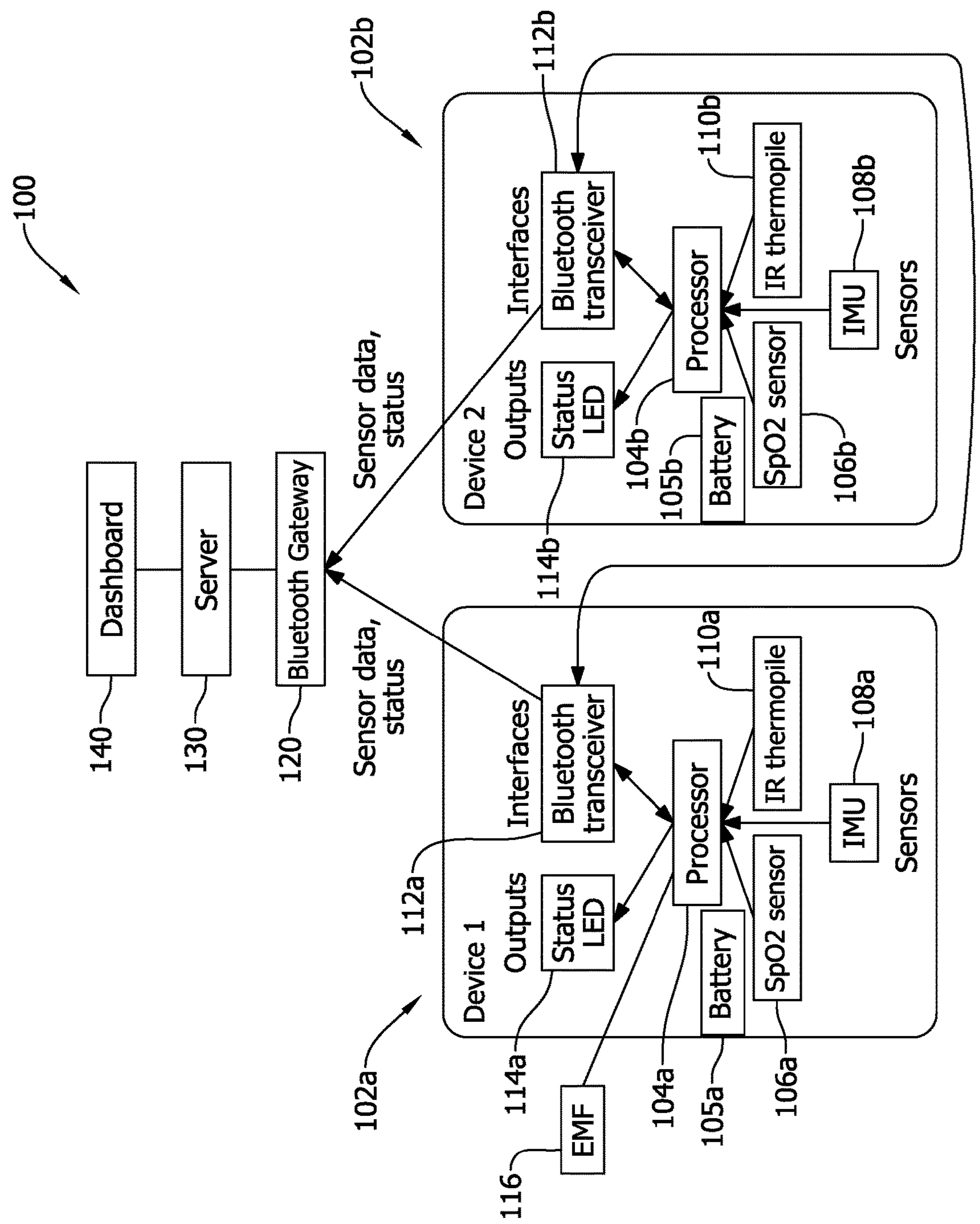
FIG. 1 is a schematic illustration of a PPE monitoring system architecture according to an exemplary embodiment of the present invention.

In order to understand the inventive concepts described below to their fullest extent, set forth below is a discussion of the state of the art and certain longstanding problems pertaining to personal wellness and PPE compliance, followed by systems, devices, and methods addressing longstanding problems in the art.

It is a practical reality in certain industries that exposure of at least some workers to hazardous or potentially hazardous working conditions cannot be avoided. As one example, workers in the electrical industry, and more specifically those working in and around energized electrical power systems, must be trained in the appropriate use of PPE to mitigate possible electrical hazards with which they may face. Aside from hazards associated with electrical shock and electrocution, electrical arc flash incidents are of particular concern.

Electrical arcing, or current flow between two or more separated energized conductors, may be experienced when installing, servicing, and maintaining electrical power systems. Arcing may also occur from electrical fault conditions and can release significant amounts of concentrated radiant energy at the point of arcing in a fraction of a second, resulting in high temperatures that may burn persons exposed to them. Additionally, arcing conditions may produce pressure blasts that are more than sufficient to knock nearby workers off their feet, and shrapnel may be generated by the pressure blasts imposing additional hazards to workers.

Further, arcing in an electrical power system may suddenly arise in various scenarios that cannot be reliably predicted. For example, insulation failure of components used in electrical systems, including but not limited to cables that interconnect electrical components and equipment, may precipitate arcing, as well as a build-up of dust, impurities and corrosion on insulating surfaces. Sparks generated during operation of circuit breakers, during replacement of fuses, and closing electrical connections on faulted lines may also produce an arc. Damage to components and equipment from rodents and pest infestations may likewise result in arcing conditions. Finally, arcing may be the result of unpredictable human error such as inadvertently dropping a tool onto energized conductors, accidental or incidental contact with energized components or equipment, and improper work procedures or mistake in following a procedure to complete a task. Safe completion of certain tasks requires a great deal of care and focus on the proper procedures that in some cases may be inherently difficult and stressful to exercise on a good day, while additional distraction or lack of focus of a worker who is unwell tends to increase a likelihood of human error.

PPE that is adequate or sufficient to provide at least a minimum level of protection to persons against potential electrical hazards has been developed for practically the entire human body to mitigate instances of electric shock, arc flash and arc blast. Persons wearing such PPE may be reasonably protected from incidental contact with energized conductors and potentially hazardous arc flash incidents and such PPE may avoid or reduce the likelihood of serious injury if such an arc flash incident occurs. Examples of PPE items may include a head covering such as a hard hat, a face covering or faceshield, a flame resistant neck protector, ear protectors, a Nomex™ suit or protective body garment covering the wearer's torso and limbs, insulated rubber gloves with leather protectors, and insulated leather footwear. Insulated tools may also be provided to complete certain tasks. Such PPE items may be fabricated from various materials to provide, among other things, thermal insulation protection to prevent severe burns to human flesh during high temperature arcing conditions, and to mitigate pressure blasts and shrapnel to avoid life-threatening wounds to a worker's head and torso if arcing conditions were to occur. Different grades of PPE are available to protect against varying degree of risk presented. For example, in the case of electrical fuses that need replacement under energized circuit conditions, fuses of higher electrical ratings may pose a greater risk to workers than fuses of lower electrical ratings, and different amounts or types of personal protective equipment may be required for replacing one fuse, for example, than for replacing another fuse in view of different risks that are presented.

Similar considerations exist for other types of hazardous environments rendering similar PPE items desirable for use such as, for example only, petroleum refineries, petrochemical plants, grain silos, wastewater and/or treatment facilities, or other industrial facilities in which sustained or volatile conditions in the ambient environment may be present with a heightened risk of fire or explosion and/or a potential exposure to caustic chemicals and substances or very hot materials presenting risks of severe burns. Various different grades of PPE are available for such risks, and the different grades may be similar to or different from the grades of PPE designed for electrical hazards, to meet the different risks posed by different situations.

In the healthcare environment, PPE items have been used to protect doctors and nurses in the treatment of patients having conditions that present health risks to healthcare providers when performing certain procedures. Different grades of PPE are available to meet different risks posed by different healthcare procedures. Paramedics, Emergency Medical Technicians (EMTs), Law Enforcement Offices, Firefighters and other emergency responders, as well as military personnel also have PPE items and protocols for responding to certain situations.

Wherever needed, PPE items are subject to appropriate and detailed safety protocols defining their use. Such protocols may detail specific items of PPE (e.g., protective suit, faceshield, gloves, etc.) needed for certain environments or for certain tasks within such environments, processes for obtaining the proper grade of PPE where multiple grades are available, processes for when such PPE items are required to be worn, processes for how such PPE items must be adorned and used, and processes for how PPE should be removed and cleaned for subsequent use. A number of practical challenges exist, however, in effective oversight of the proper use of PPE by personnel in a hazardous environment. Conscientious and well-trained workers will dutifully follow PPE protocols, but occasional misunderstanding, carelessness, and mistake may nonetheless occur with potentially severe consequences. Ensuring compliance, or detecting non-compliance, with applicable PPE protocols is therefore an ongoing concern.

For instance, a worker may have access to the proper PPE items to mitigate safety risks, but may nonetheless improperly use a PPE item in a non-compliant and therefore risky way. In the case of a faceshield for example, a user may temporarily remove his or her faceshield in a hazardous location, and present much risk in doing so without necessarily realizing it, or may forget to put the faceshield on at the required point of the procedure. Such incidents are very difficult to detect in order to allow an overseer of management of the facility to take proactive steps such as discipline or additional training for affected workers that are violating PPE protocols. Likewise, in the case of a positionable faceshield that is selectively operable in an "up" position away from one's face or a "down" position covering one's face, the faceshield may inadvertently be in the wrong position (i.e., up instead of down) when performing a hazardous task, again presenting risk without the worker necessarily realizing it. Such incidents too tend to be very difficult to detect, and management therefore generally lacks opportunity to take appropriate actions to address issues concerning PPE compliance, especially so for workers performing tasks alone.

While a protocol for some procedures may require a group of persons to perform tasks together such that any PPE non-compliance can be witnessed and reported by another worker, this is not always a reliable safeguard. Different workers may approach compliance issues from various perspectives that render compliance assessment subjective rather than objective. Certain workers may be reluctant to report non-compliance by co-workers, or may fail to recognize or understand that a compliance violation had actually occurred. In a rarer case, a worker or a group of workers may knowingly disregard aspects of a protocol that are deemed to be too onerous or restrictive.

Unless reliably and consistently detected, intentional or unintentional violations of PPE protocols may occur indefinitely to undermine important safety considerations, and across a number of workers in different areas performing different tasks in hazardous locations the challenges to oversee PPE compliance and detect non-compliance are multiplied. Smart, computer-implemented monitoring systems exist in the industrial realm that intelligently incorporate sensors in items of PPE to create a greater degree of situational awareness of worker safety across groups of workers, but known systems of this type generally lack a focus on evaluating specific PPE compliance issues of the type described above.

The onset of novel coronavirus SARS-CoV-2, also commonly referred to as COVID-19, has raised new concerns and demands for the proper use of PPE and compliance with PPE protocols in environments that prior to COVID-19 were generally not considered "hazardous" in a manner that demonstrated a prior need for PPE. Such environments include areas of industrial facilities that are isolated from conventionally defined hazards, healthcare facilities and areas of healthcare facilities that were not previously considered to present high risk scenarios, elementary schools, middle schools, high schools, colleges and universities, offices and businesses of all types, shops and retail establishments, dining establishments, churches, entertainment venues, etc. Desirable PPE items are therefore prolifically present in these environments as a means to protect workers from COVID-19, but are still subject to improper or non-compliant use in ways that are difficult to predict or control.

In the COVID-19 era, individual personal wellness is an important consideration to ensure that no transmission of the virus occurs to nearby persons. In general, persons having COVID-19 symptoms are strongly advised not to closely interact with other persons if possible but instead to distance and isolate themselves to the point of quarantine, but in some instances a person may have symptoms without necessarily realizing it. Temperature checks upon entry to a designated area are sometimes conducted as a course filter for screening purposes for personal entry to a space where other persons are present, but such temperature checks are limited in important aspects. For instance, persons who passed the temperature check upon entry may develop a fever or other symptoms after the temperature check was made. In certain cases COVID-19 illness or other illnesses may rapidly develop and may suddenly impair a person considerably, so early detection of symptoms can be important but are unfortunately rare. Especially so for persons that happen to be operating in a conventionally hazardous environment when a debilitating illness or health condition strikes, inability to detect such issues quickly may have significant undesirable consequences. Existing COVID-19 protocols and electronic tools are generally reactive by nature rather than being proactive in such aspects.

Social distancing and face coverings are other considerations to address risks posed by other persons possibly having the COVID-19 virus or other conditions that can be contagiously spread or communicated to others. Faceshields are known and effective to meet the face covering requirements, but for the reasons above are subject to misuse that can defeat the virus protection desired. Proximity sensing and contact tracing technologies have emerged to monitor social distancing aspects and collect information that may be helpful to maintain an outbreak of illness, but they are disadvantaged in some aspects for certain hazardous environments. For instance, smart-phone based contact tracing apps are of no aid in environments wherein smart phones are prohibited for safety reasons. Known contact tracing apps also operate independently of PPE systems and lack capability to assess wellness in a proactive manner.

For the reasons above, effective PPE monitoring systems are needed to more intelligently address PPE compliance with protocols that are COVID-19 related and non-COVID related but nonetheless implicate important wellness and PPE compliance concerns to varying degrees.

Exemplary processor-based sensor systems, devices and processes are described herein that include embedded sensor technology in wearable personal protective equipment devices. Technical effects achieved by the devices, systems, and processes include enhanced PPE compliance and personal wellness monitoring via combinations of different types of sensors that are provided in intelligent wearable PPE items worn by different persons to be monitored. The intelligent wearable PPE items are configured to wirelessly connect and communicate with one another in a population of persons wearing the intelligent PPE items and also to a remote centralized system that aggregates data for review, analysis and oversight of individual personal wellness and PPE compliance issues in an objective and reliable manner allowing proactive management of health and safety risks in a community of persons.

In important aspects, the combination of sensors provided in each intelligent wearable PPE item in the system of the present invention are operable in combination to provide signal inputs that may be processed and analyzed to collectively assess the wellness of the person wearing each intelligent PPE item, sense a proximity of each person wearing an intelligent PPE item to another person wearing an intelligent PPE item, assess compliant use of the PPE item by each wearer, provide feedback indicators to sensed parameters to persons wearing intelligent PPE items, record contact tracing information, and output data and information to a remote device that can be accessed by overseers via informational dashboard displays. Proactive steps may be taken by overseers to quickly and proactively respond to detected issues to minimize risks presented to a community of persons wearing the intelligent PPE items.

In a contemplated example, an intelligent wearable PPE item according to the present invention may be provided in the form of a headband equipped with a faceshield, although other wearable PPE items may likewise be provided in addition to or in lieu of headbands and faceshields as desired with similar intelligent features. The headband includes pockets or receptacles to receive one or more sensor assemblies each including a processor receiving inputs from a set of biometric sensors such as an oximetry sensor, an inertial measurement unit, and a temperature sensor to assess aspects of wellness of a person wearing the headband and faceshield. The sensors may be strategically located in different locations on the headband or on the faceshield proximate particular portions of a user's head to monitor health and wellness parameters, and the headband including the sensors is fabricated to be lightweight and adjustable in size to accommodate a variety of different users in a comfortable manner. Wire management features and the like may be built-in to the headband structure allowing the sensors to interconnect.

By virtue of the set of biometric sensors that are located proximate the head of wearer when the headband and faceshield is worn, the sensors can detect wellness of the wearer and an onset of COVID systems (e.g., fever or shortness of breath) and other health impairments that could present risk to others or affect an ability of the person to successfully complete hazardous tasks, The set of biometric sensors can also utilized to determine wellness aspects such as whether a person wearing the headband and faceshield has fainted or has fallen down and needs assistance, and to detect PPE compliance aspects such as whether a person has removed the headband or faceshield or is otherwise using them in an improper way that defeats desired safety objectives. Output signals may be generated by the processor to provide feedback signals to detected health conditions via activation of LED lights for example that may be observed by the wearer or other nearby persons. Activation of such lights may provide notice of personal health issues and possible risks that would otherwise not be detected by the persons wearing the intelligent PPE items. Wellness information and detected events may in some cases be recorded and stored by the processor in some embodiments in a manner that ensures personal anonymity in the data collected and such information may be communicated to a remote system for system archiving, analysis and reporting purposes.

Also, in contemplated examples the headband and faceshield includes a low power communications device in the form of a Bluetooth transceiver that may communicate with other Bluetooth transceivers in wearable PPE items. Based on Received Signal Strength Indication (RSSI) considerations of the Bluetooth transceivers, the distance between the persons wearing the intelligent PPE items can be deduced. Based on such RSSI considerations, when persons who are determined to be distanced by less than a predetermined amount (e.g., six feet) output signals may be generated by the processor in each PPE item to provide feedback signals to warn each person of a proximity violation that they can quickly correct. Proximity violation information may be recorded by each processor to provide effective contact tracing when needed.

The sensor and monitoring system of the invention is equally applicable to any of the areas listed above, or other areas that present similar issues or concerns, which are deemed hazardous in a non-conventional way solely because of COVID-19 issues or other pandemic or epidemic outbreaks that compel a use of PPE and/or conventional areas deemed hazard in a conventional way due to risks such as shock, blasts, impact, fire, explosion, chemical burns, exposure to high temperatures, and all sorts of other undesirable exposure to potentially harmful elements.

The inventive concepts will now be explained in detail in relation to exemplary embodiments illustrated in the accompanying Figures in which like features are indicated with like reference characters throughout. Method aspects will be in part apparent and in part explicitly discussed in the following description.

FIG. 1 is a schematic illustration of an exemplary architecture of a PPE monitoring system 100 addressing and overcoming the issues and concerns described above and therefore realizing significant benefits. The system 100 as shown includes a first processor-based sensor unit 102*a* and a second processor-based sensor unit 102*b* that are respectively embedded in different items of PPE that are worn by different persons being monitored. The sensor units 102*a*, 102*b* in contemplated embodiments are provided in headband and faceshield PPE items as described further below, although they could alternatively be provided in other types of wearable items such as those described above with similar benefits.

Each processor-based sensor unit 102*a*, 102*b* in the example shown is of the same type and configuration featuring a processor-based control element in the form of a "processor" 104*a*, 104*b* in FIG. 1 although variations are possible in this regard. As used herein, the term "processor-based" shall refer to computers, processors, microprocessors, microcontrollers, microcomputers, programmable logic controllers, reduced instruction set (RISC) circuits, application specific integrated circuits and other programmable circuits, logic circuits, equivalents thereof, and any other circuit or processor capable of executing the functions described below. The above examples are exemplary only, and are thus not intended to limit in any way the definition and/or meaning of the term "processor-based device".

In the illustrated example, the processor based control in each sensor device 102*a*, 10*b* is implemented in a microcomputer or other processor 104*a*, 104*b*, and a memory that stores executable instructions, commands, and control algorithms, as well as other data and information required to satisfactorily operate the system as explained below. The memory of the processor-based device may be, for example, a random access memory (RAM), although other forms of memory could be used in conjunction with RAM memory, including but not limited to flash memory (FLASH), programmable read only memory (PROM), and electronically erasable programmable read only memory (EEPROM).

The processors 104*a*, 104*b* are powered by on-board power supplies such as batteries 105*a*, 105*b* in each unit 102*a*, 102*b*, and the batteries may be rechargeable in some embodiments. Multiple batteries may be provided and managed by the processors 104*a*, 104*b* to provide redundant back-up power capability if a problem were to occur with one of the batteries or when one of the batteries becomes discharged. The processors 104*a*, 104*b* may accordingly track the battery charge levels in use, report the battery charge data and information with other information described below, and issue alerts and notifications to PPE item wearers and overseers when available battery power falls below predetermined limits.

The processors 104*a*, 104*b* receive signal inputs from biometric sensors such as an oximeter sensor 106*a*, 106*b*, an inertial measurement unit (IMU) 108*a*, 108*b* and an infrared (IR) thermopile sensor 110*a*, 110*b* respectively monitoring physiological parameters of the wearer when a PPE item including the sensor devices 102*a* or 102*b* is being worn. The sensors 106*a*, 106*b*, 108*a*, 108*b*, 110*a*, 110*b* may receive power directly from the power supply batteries or indirectly through the processors 104*a*, 104*b* that may be configured with power management features to increase battery life. In some embodiments, one of more of the sensors 106*a*, 106*b*, 108*a*, 108*b*, 110*a*, 110*b* could include its own power supply.

The oximeter sensors 106*a*, 106*b* are configured to monitor blood oxygen saturation levels commonly referred to as SpO2 wherein 'S' indicates saturation, p indicates pulse, and O2 indicates oxygen. The oximeter sensors 106*a*, 106*b* in contemplated examples are known optical sensor devices that provide an SpO2 measurement, typically expressed as a percentage, that indicates how effectively a person is breathing and how well blood is being transported throughout the body. An average SpO2 reading for a normal, fit adult is 96%. The processors 104*a*, 104*b* can accordingly monitor the sensors 106*a*, 106*b* and compare their outputs to predetermined thresholds to assess wellness of a person in the SpO2 aspect.

If the measured SpO2 falls below a predetermined threshold, an alert and notification can be generated to the PPE item wearer and to others of a possible health condition that may require intervention or assistance. Abrupt or unexpected changes in measured SpO2 may also trigger alerts and notifications by the processors 104*a*, 104*b* concerning wellness of the PPE item wearer. Likewise, a sudden loss of SpO2 measurement may indicate a PPE compliance event wherein the wearer has removed the PPE item including the sensors 106*a* or 106*b*. In other words, by virtue of the SpO2 measurements the processors 104*a*, 104*b* can intelligently determine whether or not the PPE items are actually being worn, and record periods of time in which the PPE items are not being worn.

The SpO2 sensors 106*a*, 106*b* in certain embodiments may be switched on and off by the processors 104*a*, 104*b* at periodic intervals so that the processors 104*a*, 104*b* receive a sampled series of SPO2 measurements over time with reduced energy consumption and longer battery life. In another embodiment, the sensors 106*a*, 106*b* may be continuously operated if desired but with increased energy consumption and shorter battery life.

The inertial measurement units (IMUs) 108*a*, 108*b* are known sensor devices that measure movement of the PPE item containing the sensor units or devices 102*a*, 102*b*. Since the sensor units 102*a*, 102*b* are in wearable PPE items, the sensors 108*a*, 108*b* in turn measure the movement of a person when the PPE item is being worn. Each IMU sensor 108*a*, 108*b* includes a set of sensor elements such as an accelerometer which measures velocity and acceleration, a gyroscope that measures rotation and rotational rate, and a magnetometer that establishes a directional heading of movement. The processors 104*a*, 104*b* receiving such measurements from the IMUs 108*a*, 108*b* can therefore intelligently track the position and movement of the PPE item (and corresponding movement of a person) and look for unexpected measurements that may require alerts and notifications to be generated. For instance, the IMU measurements may reflect a short but sudden and unexpected acceleration that could indicate a fall or loss of consciousness of a worker, an impact or blast indicating an accident with possible injury, a worker that is unexpectedly running and may be in distress or responding to an emergency event, or other wellness-based events.

The IMU measurements may also be beneficially assessed to detect PPE compliance issues such as an unexpected lack of movement if a worker removes a wearable PPE item in an unauthorized manner and puts the item down. The IMU measurements can also be calibrated to detect certain signatures corresponding to PPE movement and position relative to the person wearing it. For example, an IMU associated with a faceshield may be recognized by the processors 104*a*, 104*b* in an "up" or "down" position and therefore can intelligently determine whether the faceshield is up or down and when it was changed from up to down or vice versa. The IMUs may also facilitate a detection of a person in an unauthorized location and other events of interest that may otherwise have gone undetected.

The sensors 110*a* and 110*b* are known infrared thermopiles that measure the body temperature of the person wearing the PPE item. Predetermined limits can be set for the processors 104*a*, 104*b* to measure body temperature and confirm that the person has a normal temperature within a range of expected temperature, an elevated temperature (i.e., fever) above a normal temperature range corresponding to an illness, or a failure to record an expected temperature corresponding to a compliance event wherein the person is not wearing the PPE item. When applied to a faceshield, a temperature sensor 110*a* or 110*b* may also assist in determining whether the faceshield is in up or down position. The up position will generally be expected to fail measure the wearer's body temperature at all since the faceshield is not proximate the user's face, while the down position will facilitate a body temperature measurement.

In combination, the sensors 106*a*, 106*b*, 108*a*, 108*b*, 110*a* and 110*b* provide seamless evaluation of personal wellness and PPE compliance monitoring in a sophisticated manner. The sensors 106*a*, 106*b*, 108*a*, 108*b*, 110*a* and 110*b* provide some redundancy in feedback signals that in combination can be used in a corroborating manner to intelligently confirm detection events or identify error conditions. For example, when the sensors 106*a*, 106*b* indicate normal SpO2 measurements, the sensors 108*a*, 108*b* indicate normal expected movement and position, and when the sensors 110*a* and 110*b* indicate expected temperatures they provide three different points of reference that the PPE items including the sensors are actually being worn by a person. Likewise, when the sensors 106*a*, 106*b* indicate no SpO2 measurements, the sensors 108*a*, 108*b* indicate no expected movement and position, and when the sensors 110*a* and 110*b* indicate no expected temperatures they provide three different points of reference that the PPE items including the sensors are not actually being worn. From a power management perspective, if it is detected that the respective PPE item is not being worn, the sensor units may be powered down or enter a sleep state to prolong battery life, while the sensor units 102*a*, 102*b* may wake up and resume normal operating power when the sensors 106*a*, 106*b*, 108*a*, 108*b*, 110*a* and/or 110*b* once again indicate that the respective PPE items are again being worn.

As a further example, when the sensors 106*a*, 106*b* indicate normal SpO2 measurements, when the sensors 108*a*, 108*b* indicate normal expected movement and position, and when the sensors 110*a* and 110*b* fail to measure temperatures it can be deduced that a faceshield is in the up position away from the user's face. In this case, the other sensors 106*a*, 106*b*, 108*a*, 108*b* indicate that the PPE items actually are being worn, and the failure of the sensors 110*a*, 110*b* to register temperature in an expected range means that the sensors 110*a*, 110*b* are distanced from the wearer's body due to the "up" position of the faceshield. For a faceshield that does not have a positional up/down capability the same sensor outputs would indicate an error condition in the temperature sensors.

Considering another scenario, when the sensors 106*a*, 106*b* do not provide SpO2 measurements, when the sensors 108*a*, 108*b* indicate normal expected movement and position, and when the sensors 110*a* and 110*b* indicate normal body temperatures it may be presumed that the sensors 106*a*, 106*b* are erroneous or inoperative. Notices and alerts can therefore be generated, and the wearer can be prompted to obtain a replacement PPE item that is fully functional for all of the sensors provided.

In still another example, when the sensors 106*a*, 106*b* indicate abnormal SpO2 measurements, when the sensors 108*a*, 108*b* indicate abnormal movement and position (or an unexpected absence of movement and position), and when the sensors 110*a* and 110*b* indicate an abnormal temperature, it can be deduced that the wearers are in physical distress and need help. Likewise, when the sensors 106*a*, 106*b* indicate normal SpO2 measurements, when the sensors 108*a*, 108*b* indicate abnormal movement and position, and when the sensors 110*a* and 110*b* indicate normal temperature the persons wearing the PPE item may have fallen. Self-deterministic evaluation and diagnosis of specific and distinct events can be made by the processors 104*a*, 104*b* as well as detections of error conditions that may trigger different notifications and alerts to be made via comparison of the sensor outputs and intelligent interpretation thereof.

In the example shown, each sensor unit 102*a*, 102*b* further includes a combination transmitter and receiver (i.e., a transceiver) 112*a*, 112*b* configured for short-range wireless communication with one another transceiver via known Bluetooth standards and protocol. Such Bluetooth transceivers are continuously seeking to communicate with another Bluetooth device and accordingly whenever the transceiver 112*a* is within signal range of the transceiver 112*b* the two devices may recognize one another via unique IDs provided to each device. The transceivers 112*a*, 112*b* are relatively low power devices and therefore promote longer battery life, although non-Bluetooth transceivers and communication protocols other than Bluetooth protocols are possible in other embodiments such as, for example only, Near Field Communication (NFC), Wi-Fi communication or communication established via Local Area Networking (LAN). In other cases, short range radio devices may be utilized having an extended signal range relative to Bluetooth devices when implemented in, for example, mesh network protocols and the like, and in still other cases long range signal transmission and higher power radio transmission of signals may be employed to communicate over long distances.

The transceivers 112*a*, 112*b* also allow aspects of PPE compliance to be evaluated in certain embodiments. For instance, the IDs of each transceiver can be correlated to the type or grade of PPE items to which it is embedded. As such, if transceiver 112*a* corresponds to a Level 1 type of PPE item corresponding to a first and lower level of risk, if it detects a signal from a transceiver 112*b* that corresponds to a Level 3 type of PPE item that corresponds to a much higher level of risk, it can be deduced that one of the persons wearing the PPE items has an improper type/level of PPE item for the area where the persons reside. In such a scenario a notification or an alert may be generated by the processor 104*a* and 104*b*. This case may also correspond to a person in an unauthorized location, and again a notification or alert can be generated.

The transceivers 112*a*, 112*b* may also allow proximity sensing of two persons each wearing the respective PPE items to assess proximity-based aspects of a safety protocol. In general, as the Bluetooth transceivers 112*a*, 12*b* operate they measure a Received Signal Strength Indicator (RSSI) level from other Bluetooth transceivers. Generally speaking, the closer the transceivers 112*a*, 112*b* are to one another the stronger the RSSI between them and as the distance between them increases the RSSI level will become weaker until eventually they are out of signal transmission range with one another and therefore cannot continue to communicate. As such, in the calibration of the devices, the RSSI level can be a good indicator of proximity of two persons when the PPE items are worn.

In a contemplated embodiment, when the measured RSSI level is below a predetermined limit at least a predetermined amount of distance between the two persons can be deduced, but as the RSSI level approaches or exceeds a predetermined limit it can be deduced that the two persons are too close to another. Therefore, the processors 104*a*, 104*b* can determine and evaluate proximity compliance or non-compliance based on the measured RSSI levels of the transceivers 112*a*, 112*b*. In one example, the RSSI limits utilized by the processors 104*a*, 104*b* may be determined to assess a 6 foot proximity limit between the persons to achieve desired distancing to reduce a possible transmission of COVID 19. Higher and lower proximity limits and settings are possible, however, to meet particular needs and achieve particular objectives.

If a proximity violation is detected (i.e., the two persons are too close to each other based on the RSSI values of the respective transceivers 112*a*, 112*b*) data and information can be recorded by the processor for contract tracing purposes. The unique IDs of each transceiver can be correlated with specific individuals for contact tracing purposes to manage possible outbreaks or epidemics of sickness or disease in the monitored locations. Of course, the same data and contact tracing may also be used to confirm other aspects of compliance such as confirming that all required persons in a group of workers are actually present in the desired proximity to one another while a task or procedure is being performed, or alternatively to identify a missing one of the required workers. The contact tracing capability can be used to confirm required interactions between certain workers or persons or alternatively to identify an unexpected or unauthorized interaction of workers that may be problematic from a safety perspective.

Feedback indicators 114*a*, 114*b* may also be provided for use by the persons wearing the PPE items including the sensor devices 102*a*, 102*b*. In contemplated embodiments the indicators 114*a*, 114*b* may be one or more illumination elements that are operable to emit different colored light (e.g., red/green/blue (RGB) light emitting diodes (LEDs)) that may be operable to emit different colors of light or the indicators 114*a*, 114*b* may be respectively different lighting elements each respectively providing a single color light that are selectively illuminated to achieve desired color coded notifications to other persons wearing the PPE items such that each worker may see and confirm the status for other respective workers that are present.

In a simple example, an emitted red color from the feedback element 114*a* or 114*b* may indicate a proximity violation to another worker or provide a warning to another worker of a possibly unwell person that is being encountered, while a green light indicates to another worker that proper distancing is being maintained or that the person being encountered is well. In further and/or alternative embodiments additional feedback elements such as audio elements or haptic elements may be provided to notify or alert the persons of detected issues. The feedback indicators provided may be positioned in any location on the PPE item so that they may recognized by sight, sound or tactile sensation in order for another person to act accordingly in response. For instance, when a first worker observes a red light notification from the PPE item worn by a second worker, the first worker can move away from the second worker to cure a detected proximity violation, can make appropriate inquiries to the second worker, can provide instruction to the second worker, and/or seek or render appropriate aid or assistance to the second worker. Flashing light signals or combinations of feedback lights may be implemented in a coded manner to represent different detected events or different gradations of detected conditions that can be decoded by trained workers who observe them.

It is understood that additional sensors may be provided in the sensor units 102*a*, 102*b* or externally provided to meet the needs of certain end uses and applications. For example, an electromagnetic field (EMF) detector 116 may be provided to assist an electrical worker. The electromagnetic field detector may sense a presence of a magnetic field induced by electrical current flow in a conductor and therefore may assist the worker in knowing whether or not a component or machinery in an electrical power system is "live" or energized when conducting a maintenance or service procedure. External temperature sensors and other environmental sensors may also be provided to assist workers in assessing risks in taking any particular action.

As further illustrated in FIG. 1, a Bluetooth gateway device 120 is within signal range of the transceivers 112*a*, 112*b* to collect sensor data and information and any request or notification data from the processors 104*a*, 104*b*. The Bluetooth gateway device 120 then sends the collected data and information to a remotely located computer server device 130 storing information in a database. The stored data and information on the server device 130 (or in a database associated with the server device) may, in turn, be accessed through computer devices for review in graphical information dashboard displays 140 that can quickly be used to assess wellness and PPE compliance across a community of persons being monitored through wearable PPE items. The dashboard displays may be accessed, for example, by authorized users via an Internet portal established by a smart phone device or another computing device (e.g., a tablet device or a notebook/laptop computer) as desired. Alerts and notifications may be presented to such smart phone or computing devices via any form or medium desired in an active or passive alert (e.g., email, SMS text notification, voice message, push notification, etc.). In some cases, analysis of data to generate notification and alerts could be made on the server side instead of the processors 104*a*, 104*b* in the sensor devices 102*a*, 102*b*. Archiving of data and sophisticated reports may be generated to assess worker wellness, compliance with safety protocols, and to diagnose and troubleshoot issues in the sensor system.

While two sensor devices 102*a*, 102*b* and one gateway device 120 are shown, the system is scalable to include any number n of sensor units and gateway devices 120 distributed about a monitored area. In contemplated embodiments the sensor units 102*a*, 102*b* provide data and information in more or less real time to the gateway device(s) 120 present. In other embodiments, however, the data can be collected and stored and communicated to the gateway device 120 in a batch process. In some cases, the sensor devices 102*a*, 102*b* may include a connector port facilitating data transmission to the gateway via a connected cable. In some embodiments the sensor devices 102*a*, 102*b* may communicate with a smart phone device that in turn may communicate with the gateway device 120 or directly communicate with the server 130. Since some hazardous locations do not permit smart phone devices, however, the architecture illustrated does not depend on smart phone devices and is particularly well suited for conventionally hazardous environments.

The sensor units 102*a*, 102*b* and the components described in contemplated embodiments are packaged in respective housings for assembly to a PPE item in a manner wherein the components may reliably perform the functions described. The components described may be arranged on a circuit board internal to the housings provided. The operation of the biometric sensors will require some access to the person's body in order to operate and as such portions of the sensors may be located on the exterior surface of the housings so that the biometric sensors may operate with respect to exposed skin of the person to measure SpO2 and body temperature as described above. Alternatively, openings or apertures may be provided in the housings for the sensor devices to operate on exposed skin of the wearer.

When applied to different types of PPE items, the sensors in the sensor units 102*a*, 102*b* may be exposed to different parts of the human body in an in unobtrusive manner. In a contemplated example, the sensors may be located on the forehead and/or temple areas when the PPE items are worn on the person's head. In a further example, multiple sensor units 102*a*, 102*b* may be provided at different locations on the user's head in the same PPE item to make biometric measurements at different locations that can be compared to one another for still further sophistication in the device intelligence or to provide communication capabilities in different locations to avoid signal blocking by the human body that may otherwise occur to disrupt communication with another intelligent PPE device worn by another person.

In another example, the sensor units 102*a*, 102*b* may be exposed to other parts of the body such as the wrist for effective monitoring in an unobtrusive manner and therefore may be incorporated in a wristband or in a glove. Different types of biometric sensors may be provided in different types of housings for use with different types of PPE items worn on different areas of the body. More than one intelligent wearable PPE item may be worn by the same person to provide further degrees of redundancy and data outputs that may be compared to one another to confirm events of interest and to detect error conditions in specific components.

In some instances, the sensors described can be separately provided from the housings including the processors and interconnected by wires or cables so that, for example, a sensor or sensors may be positioned proximate a user's forehead while the processor and transceiver may be positioned near the temples of the person's head to minimize any possible instruction in the field of view of the person wearing the PPE. Sensors may therefore be distributed amongst different locations on the person's body as desired to most effectively and reliably measure the respective biometric parameters or to measure the same parameters at different locations on the person's body to compare results and undertake health checks of the system.

Also, in some instances additional non-biometric sensors such as the electromagnetic field detection sensor described above may be desirably located at a location other than the head of the wearer but still may desirably communicate with the processor 104*a* or 104*b*. As such, a cable may extend to another part of the body where the electromagnetic field detection sensor is more desirably located. Wireless communication of external sensor data to the processors 104*a*, 104*b* is also possible, and in such case an electromagnetic field detector may be provided in glove or in a tool or other implement that can wirelessly communicate with the processor 104*a* or 104*b* or may communicate directly with a gateway device 120. As such, special purposes sensor units having different components and form factors may be provided for different purposes that may communicate with one another or with a gateway device 120 when desired.

Also, in some instances additional non-biometric sensors such as the electromagnetic field detection sensor 116 described above may be desirably located at a location other than the head of the wearer but still may desirably communicate with the processor 104*a* or 104*b*. As such, a cable may extend to another part of the body where the electromagnetic field detection sensor is more desirably located. Wireless communication of external sensor data to the processors 104*a*, 104*b* is also possible, and in such case an electromagnetic field detector may be provided in glove or in a tool or other implement that can wirelessly communicate with the processor 104*a* or 104*b* or may communicate directly with a gateway device 120. As such, special purposes sensor units having different components and form factors may be provided for different purposes that may communicate with one another or with a gateway device 120 when desired.

Having described sensor units and devices, and also applicable operating algorithms functionally per the description above, those in the art may accordingly implement the algorithms via programming of the controllers or other processor-based devices. Such programming or implementation of the concepts described is believed to be within the purview of those in the art and will not be described further. While an exemplary architecture has been described, variations are possible and the system architecture set forth is made for the purposes of illustration rather than limitation.

Figure 2:
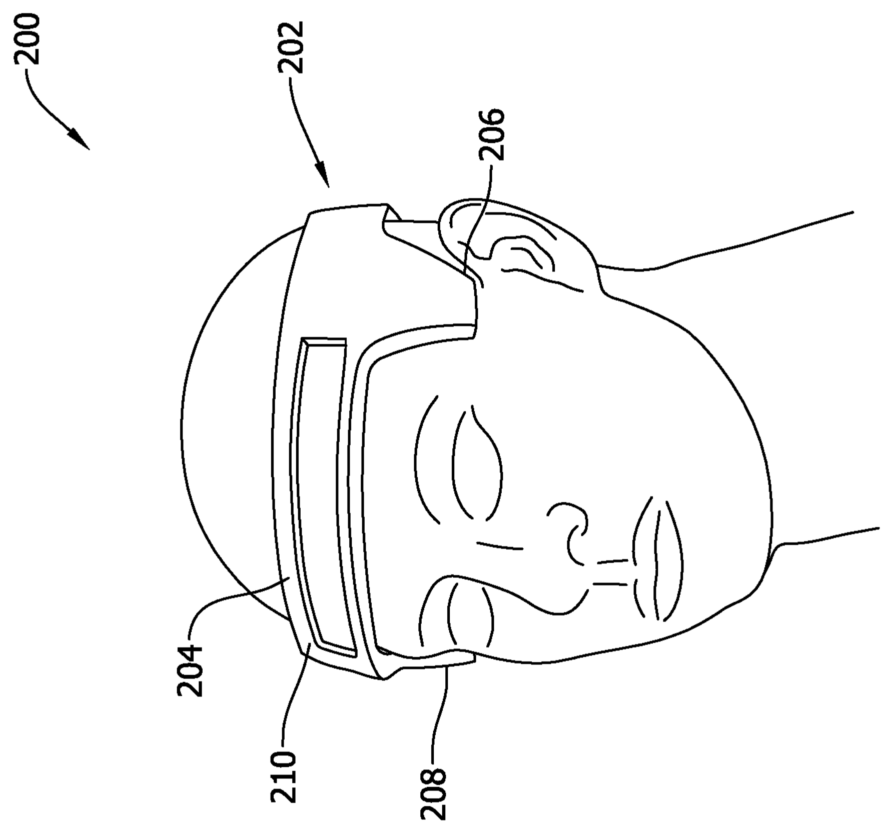
FIG. 2 is a perspective view of a portion of a first exemplary embodiment of an intelligent wearable PPE item for the PPE monitoring system shown in FIG. 1.

FIG. 2 is a perspective view of a portion of an exemplary embodiment of a wearable PPE item assembly 200 for the monitoring system 100 shown in FIG. 1. The PPE item assembly 200 includes a headband 202 sized and dimensioned to be fitted around and received upon a person's head such that the headband 202 is engaged on the person's head and the person may move about with the headband 202 on and perform tasks. As also shown in FIG. 2, the headband 202 includes an elongated front section 204 extending above the person's eyes and spanning the person's forehead, and opposing enlarged sensory sections 206, 208 extending over the temple area on each side of the person's head. The sensory sections 206, 208 may include sensor units such as the sensor units 102*a*, 102*b* described above. While two sensory sections 206, 208 are shown in particular locations relative to one another, only one sensory section or more than two sensory sections can be provided in similar or alternative locations to house some or all of the components of the sensor units described above. While a particular shape and geometry of the headband 202 including the front section 204 and sensory sections 206, 208 is shown in the Figures, variations are of course possible.

Figure 3:
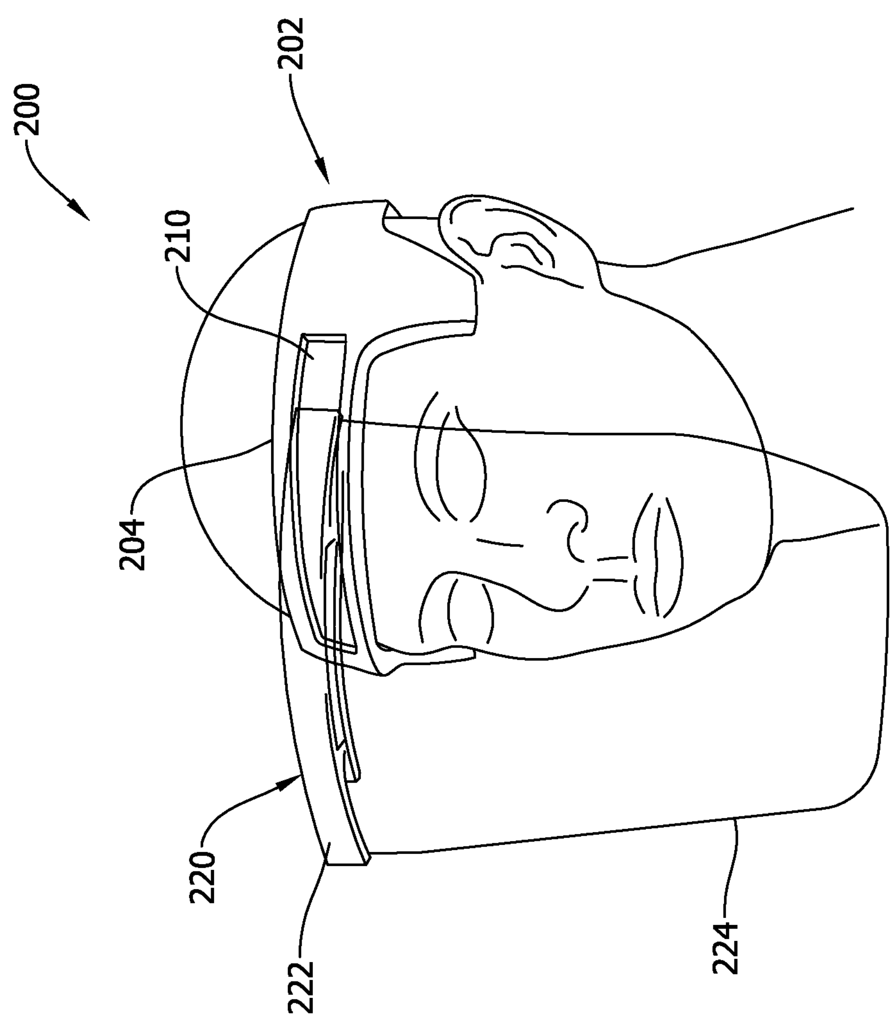
FIG. 3 is a perspective assembly view of the intelligent wearable PPE item shown in FIG. 2.

The front section 204 of the headband 202 includes a forward facing recess 210 that may receive and support a transparent faceshield 220 attachable thereto as shown in FIG. 3. The headband 202 may be fabricated from Expanded Polystyrene (EPS) foam material in one embodiment and is therefore lightweight, while the faceshield 220 is formed from a suitable plastic material. Variations in materials are possible that would be suitable for the PPE purposes described herein.

The faceshield 220 in the example shown includes an upper section 222 that couples to the recess 210 in the headband 202 and a lower section 224 depending from the upper section 222. When the upper section 222 is attached to the headband 202, the lower section is suspended in front of the wearer's face in a manner that curves around the front and sides of the persons face and head. The lower section further extends below the wearer's chin and protects at least a portion of the person's neck. The upper section 222 in the example shown further includes a hinge element allowing the faceshield to be moved to an "up" position oriented upward and away from the wearer's face and a "down" position extending in front of and around the user's face. In the up position of the faceshield the user's face and neck is uncovered and therefore generally unprotected but the wearer has an obstructed field of view and an unimpeded ability to have a conversation or listen to ambient noise, while in the down position the user's face is covered and shielded or protected, but with some impairment of the wearer's field of view and hearing and conversational ability. Between the up and down positions the faceshield 220 is rotated about the upper section 222 between 90° and 180°, for example, while remaining attached to the headband 202.

The faceshield 220 in a contemplated embodiment is fabricated from a heavy duty, reinforced plastic material providing electrical grade PPE protection for a worker performing tasks in an energized electrical power system. Various other contemplated embodiments are possible having various other protective capability to withstand impact and temperature effects, and in some cases the faceshield 220 is provided as primarily a simple barrier for virus transmission containment that is not necessarily expected to withstand high temperature and pressure or severe mechanical impact from shrapnel or other items. In some cases the headband 202 could be fabricated from more rugged materials to provide enhanced protection apart from the faceshield 220. In other cases, the person could wear a separately provided hard hat in addition to the headband 202 and faceshield 220, while the headband 202 could alternatively be integrated in a hard hat assembly that does not have a faceshield in some instances or involves a faceshield that is separately provided. The assembly 200 is therefore easily adaptable to protect a person from explosion or fire in combination with additional PPE items (e.g., suit, hat gloves, and boots).

Also, in some contemplated embodiments the headband 202 could be used as a stand-alone PPE item in an office or school environment, for example, wherein the faceshield 220 serves merely as a barrier shield to virus transmission without any corresponding need for thermal insulation or shock/impact resistance presented by other hazards. Also in some contemplated embodiments and scenarios the headband 202 could be worn as a stand-alone item without the faceshield in favor of a smaller and lighter facemask that may cover the person's mouth and nostrils but not the person's eyes or ears. Still, many of the benefits described could also be achieved if the headband 202 was worn without a facemask or without a faceshield if there was no risk presented in having the user's face completely uncovered.

Figure 4:
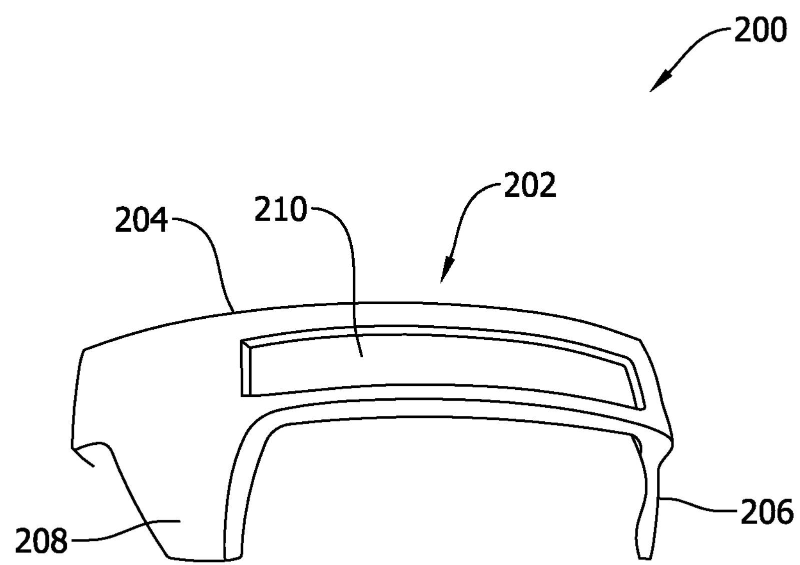
FIG. 4 is another perspective view of a portion of the intelligent wearable PPE item shown in FIGS. 2 and 3.
Figure 5:
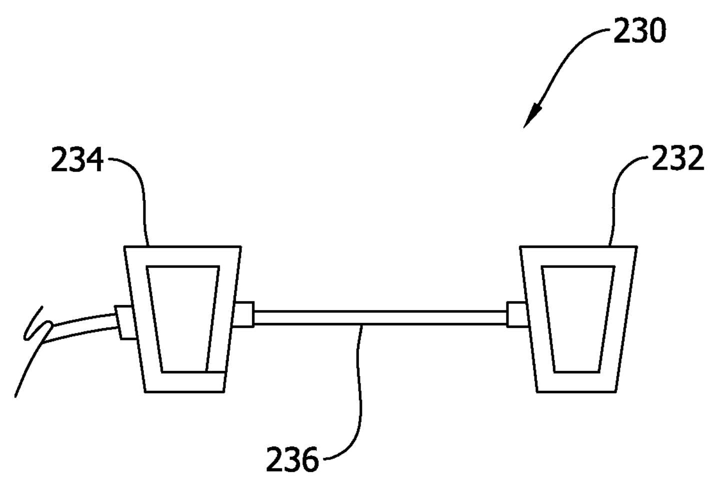
FIG. 5 is a front elevational view of an exemplary sensor assembly for the intelligent wearable PPE item shown in FIGS. 2 through 4.

FIG. 5 is a front elevational view of an exemplary sensor assembly 230 for the wearable PPE item assembly 200 shown in FIGS. 2 through 4. The sensor assembly 230 is shown to include a first housing 232 and a second housing 234 with a cable 236 extending between the housings 232, 234. The housings 232, 234 may each include the sensors, processor and transceiver described earlier in relation to the sensor units 102 of FIG. 1 and therefore provide redundant sets of sensor devices, or the housings 232, 234 may alternatively include such components distributed amongst the two housings provided. For example, the processor and Bluetooth transceiver could be included in the housing 232 while the sensors are provided in the housing 234. Likewise, one of the housings 232, 234 may contain a battery pack with the other housing including the sensor components, processor and transceiver. Considerable variation is possible in this regard, and in some embodiments one or more of the sensors could also be located at a distance from the housing 232 or 234. Regardless, the cable 236 provides electrical interconnection between the components in each housing 232, 234 or outside of the housings to establish power and signal paths to afford the desired intelligence and ability to monitor wellness and PPE compliance as described. Additional housings and components in PPE equipment may be included in addition to the housings 232, 234 to provide a distributed set of different housings and sensors at various different locations in the PPE items utilized. The housings 232, 234 may be provided in modular form with the same form factor, shape and profile for assembly in the headband 202 or may alternatively have different form factor, shape and profile. Plugs and connectors may be utilized to facilitate the connection of the cable 236 to the housings 232, 234 and in some embodiments more than one cable may be provided.

Figure 6:
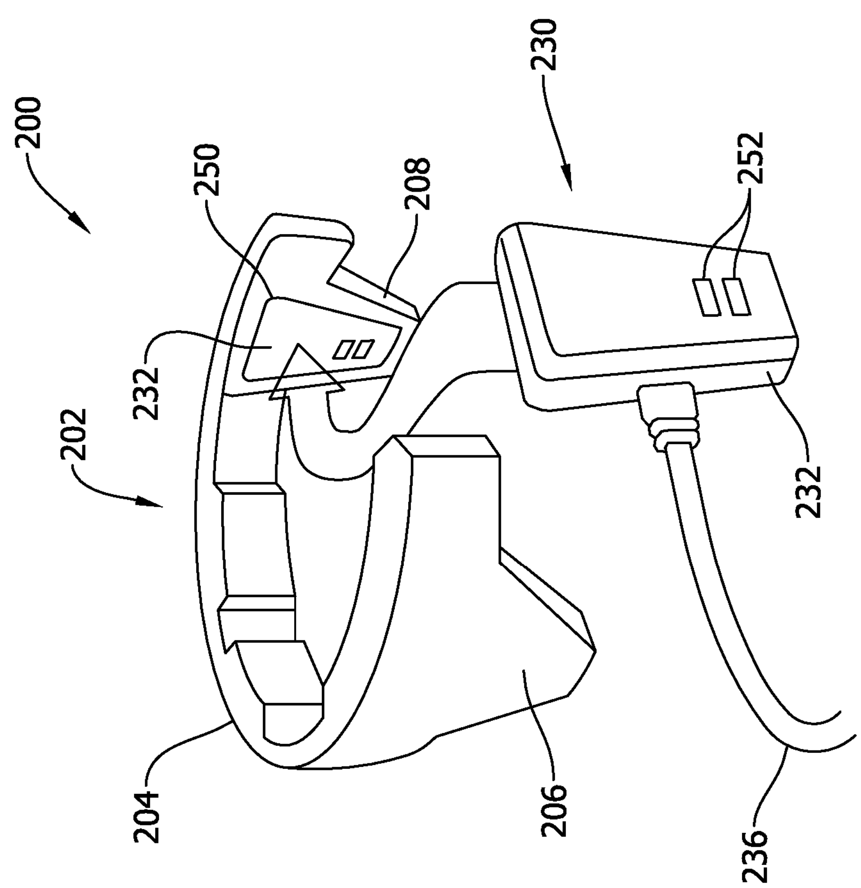
FIG. 6 is a rear perspective view of a portion of the intelligent wearable PPE item shown in FIG. 4 with a portion of the sensor assembly shown in FIG. 5 installed.

FIG. 6 is a rear perspective view of the wearable headband 202 including a portion of the sensor assembly 230 shown in FIG. 5. The inner surface of the enlarged sensory sections 206, 208 of the headband 202 include integrally formed pockets, recesses, compartments or receptacles to receive one of the sensor housings 232, 234. The outer shape and profile of the receptacles may match the outer shape and profile of the housings 232, 234 such that the sensor housings 232, 234 may be coupled thereto with snap-fit engagement. Unique, non-rectangular shapes may be provided in the housings 232, 234 in various embodiments with corresponding uniquely shaped receptacles to ensure that only compatible sensor units may be received in the receptacles. In further embodiments, fasteners such as screws may be used to secure the sensor housings 232, 234 in place. The cable 236 extends around a circumference of the headband 202 between the housings 232, 234 when attached to the headband 202.

Communication ports 252 may be provided in the sensor housings 232, 234 for battery charging, data transmission or other purposes. The communication ports may be, for example, USB ports or micro-USB ports in contemplated examples which may be connected to other computing devices via compatible cables. The rear side of the front section 204 of the headband is seen to include an undulating surface profile in FIG. 6 to reduce surface contact area on the wearer's head and provide a more comfortable device. Padding may be provided for still further comfort.

Figure 7:
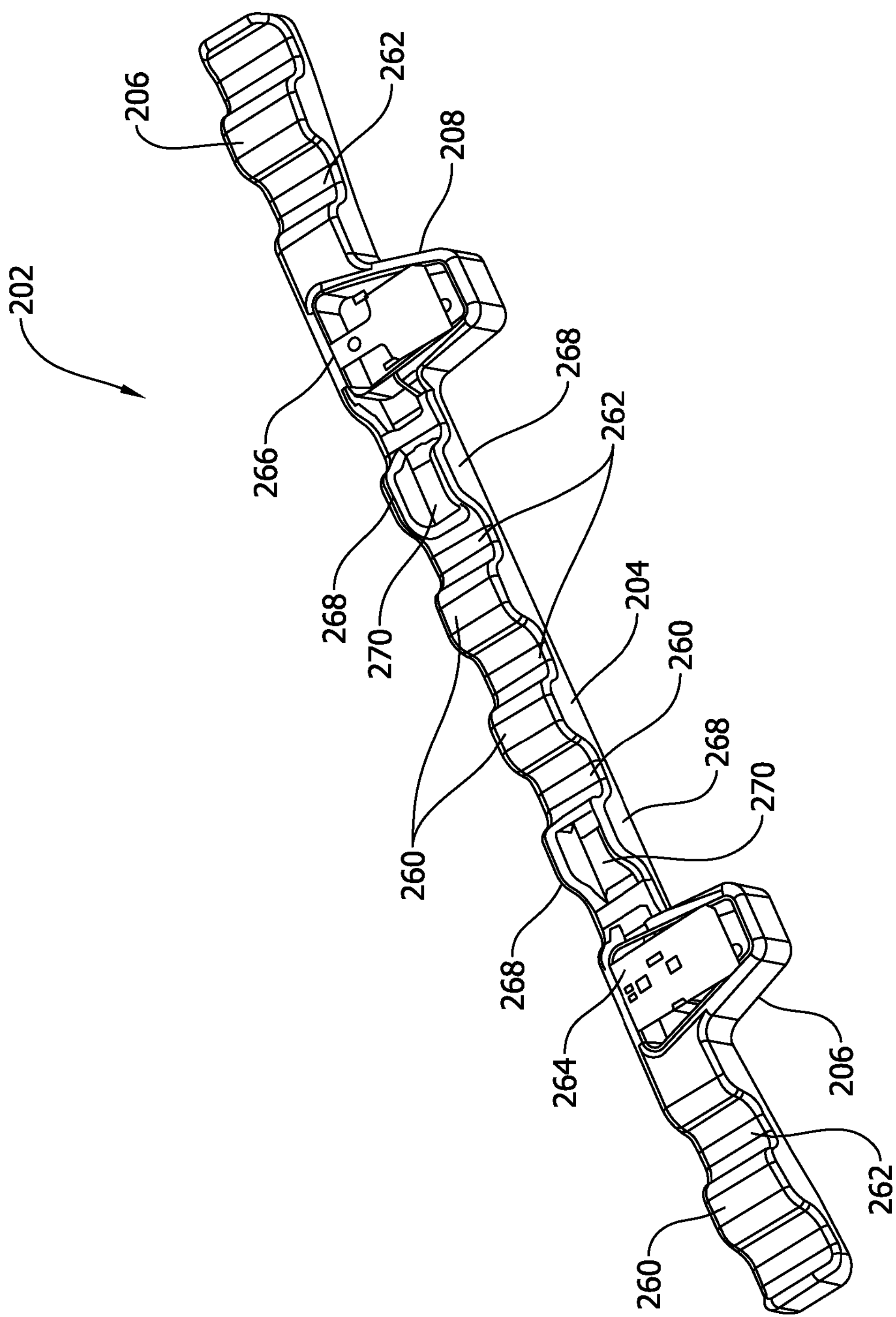
FIG. 7 is a fabrication view of the portion of the intelligent wearable PPE item shown in FIGS. 2 through 6.

FIG. 7 is a fabrication view of the wearable headband 202 shown in FIGS. 2 through 6 showing the internal shape and profile in further detail. While the front side of the front section 204 of the headband 202 has a generally smooth outer surface, the rear side of the headband includes a series of spaced apart projections 260 and adjacent recesses 262 imparting an undulated or scalloped profile. The top surfaces of the projections 260 define contact areas that engage the wearer's head when worn, and the recesses 262 reduce the amount of material needed to fabricate the headband 202 as well as improve airflow and increase comfort while the headband 202 is being worn. In between the enlarged sensory sections 206, 208 that house the sensor unit components including the processor and transceiver components that are represented on sensor boards 264, 266 shown in FIG. 7 that are differently configured, the headband 202 also includes opposing projections 268 on upper and lower edges of the front section 204. Wire management slots 270 extend between the projections 268 for the cable 236 which may also be extended through internal channels in the projections 260. Engagement openings and anchor features may also be formed in the headband 202 to facilitate attachment of the faceshield 220.

The body of the headband 202 having the features shown and described may be formed and fabricated in an integral single piece construction that exhibits a resilient elasticity to expand and contract to fit the heads of different users without separately provided features to facilitate desired adjustability for larger or smaller users. In another embodiment, multi-piece headband constructions are possible that provide varying degrees of adjustability to fit different users. In contemplated scenarios, separately fabricated headband pieces may be rotatably coupled to one another, expanded or contracted relative to one another or otherwise adjustably positionable to achieve an optimal fit on the heads of wearers of different size. Preferably, the headband 202 will fit snugly but comfortably in all embodiments such that the wearer can move about and perform tasks without risk of the headband falling off. While an exemplary geometry of the headband 202 is shown and described in relation to FIG. 7, alternative geometries are possible.

Figure 8:
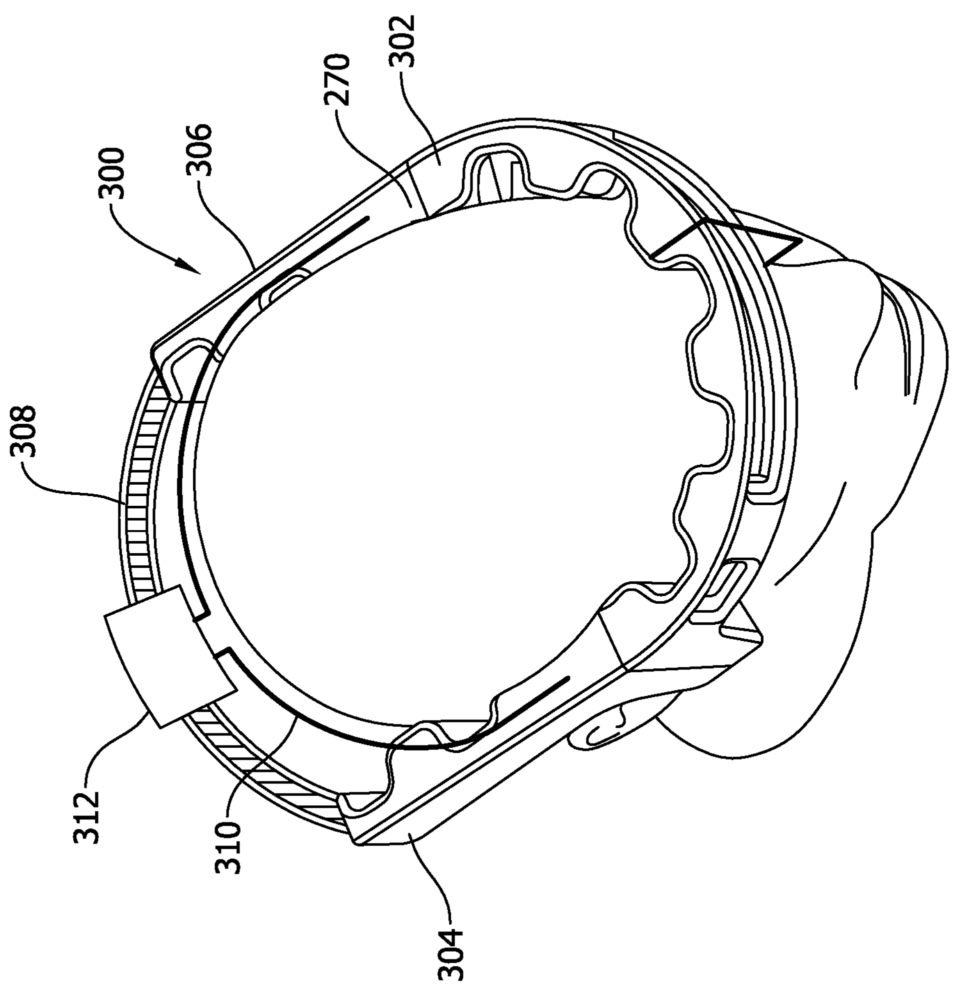
FIG. 8 is a perspective view of a second embodiment of an intelligent wearable PPE item for the system shown in FIG. 1.
Figure 9:
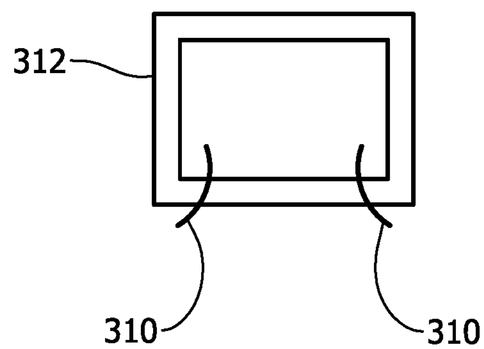
FIG. 9 is a sectional view of a first portion of the intelligent wearable PPE item shown in FIG. 8.

FIG. 8 is a perspective view of a second exemplary embodiment of a wearable PPE item assembly 300 for the monitoring system 100 of FIG. 1 that be used with the faceshield 220 shown in FIG. 3. The PPE item assembly 300 is in the form of a headband including a front section 302 extending across the wearer's forehead and side sections 304, 306 extending around the sides and slightly beyond the back of the wearer's head. An adjustable strap 308 extends between the distal ends of the side sections 304, 306 to secure the headband in place with a desired amount of gripping force on the wearer's head. Sensors such as those shown in FIG. 1 are distributed in the front or side sections 302, 304, 306 and are interconnected by wires 310 exiting the side section toward the rear of the wearer's head and elements in a protective pouch or housing 312 may receive the wires 310 as further shown in FIG. 9. The protective housing or pouch 312 may include the processor and transceiver components and a battery power supply in a contemplated embodiment.

Figure 10:
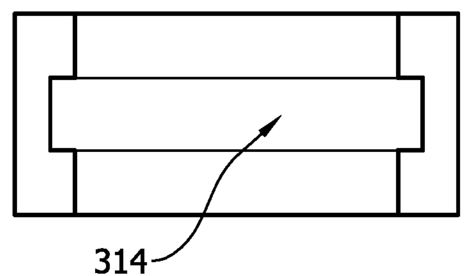
FIG. 10 is a second sectional view of a first portion of the intelligent wearable PPE item shown in FIG. 8.
Figure 11:
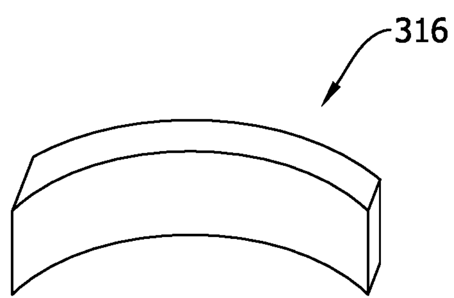
FIG. 11 is a perspective view of an exemplary insert for the intelligent wearable PPE item shown in FIG. 8.

As shown in the sectional view of FIG. 10, the front section 302 of the PPE item 300 may include wire management channels 314 in the headband design to receive wires for the various sensors provided in different locations of the front section 302 or side sections 304, 306. A foam insert 316 or other padding shown in FIG. 11 may be included to protect the wires in the wire channel 314 and/or to provide comfort for the wearer. In other embodiments, a longitudinal slot extending along part or all of the headband structure may be built-in to the headband structure to house wiring to make the desiring electrical connections.

In either of the PPE item assemblies 200 or 300, the biometric sensors described in relation to FIG. 1 are located proximate strategic areas of the face and head to gather vital statistics of the wearer. For example, one or more of the biometric sensors may be positioned over the superficial temporal artery of the wearer. This is a major artery of the head arising from the external carotid artery when it splits into the superficial temporal artery and maxillary artery, facilitating measurements of pulse and oxygen saturation levels. Other locations of sensors are likewise possible. The connections between the sensor, processors and transceivers of the sensor units are unobtrusive. Seamless integration of biometric and processor-based controls is realized to intelligently monitor and manage personal wellness and PPE protocol compliance in a highly reliable and objective manner for more effective oversight and management of personal safety issues in a community of persons for the various different applications and needs described above in various contemplated examples.

Figure 12:
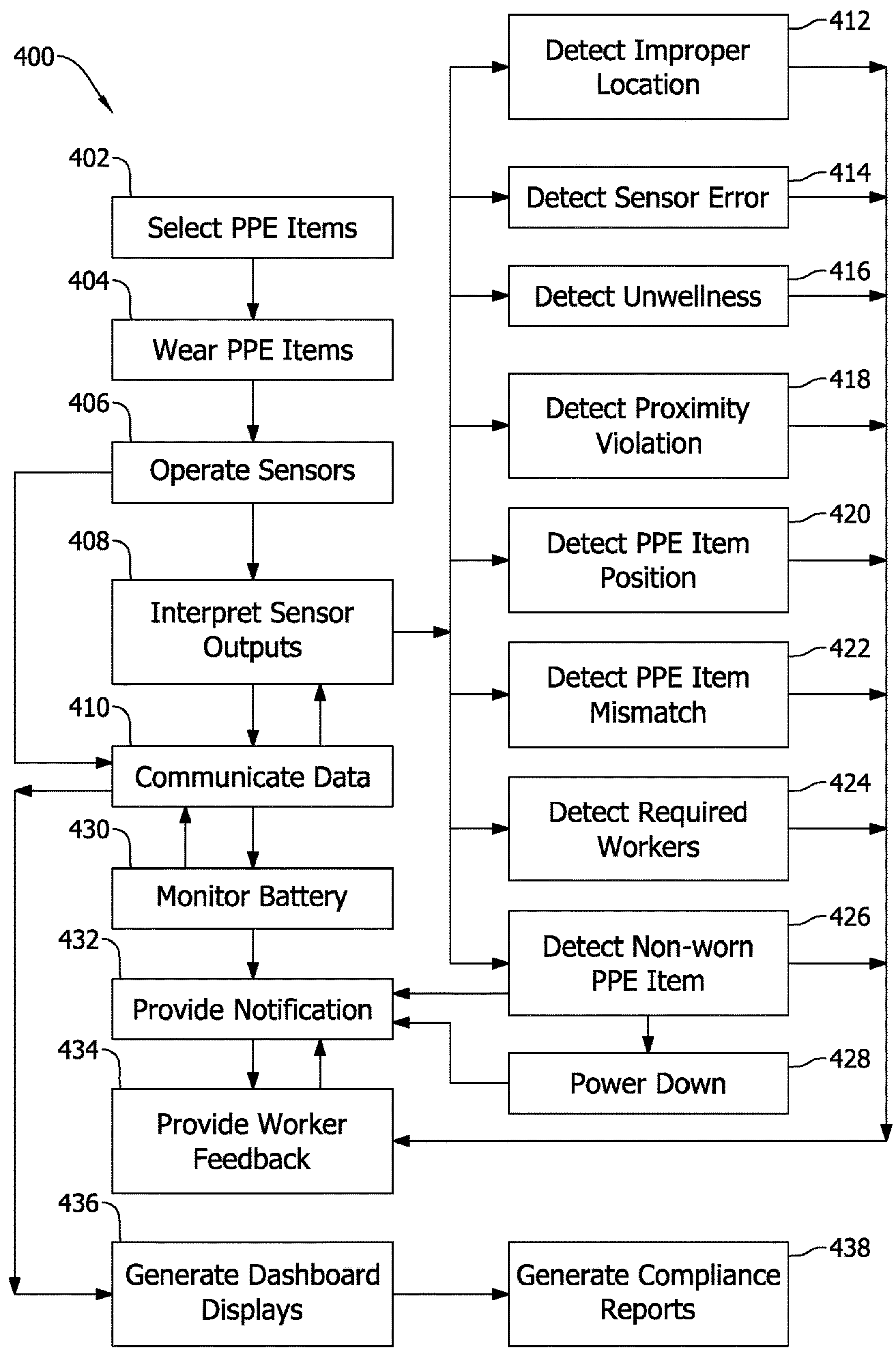
FIG. 12 is a flowchart of exemplary algorithmic processes implemented in the system shown in FIG. 1.

FIG. 12 is a flowchart of exemplary algorithmic processes 400 implemented with and by the system shown in FIG. 1. The process 400 assumes that the system 100 as described above has been implemented with sensor units 102 embedded in PPE items such as the PPE item assemblies 100 and 200 described above or other PPE items, and that gateway devices 120 are in place to communicate with the sensor units 102 of PPE items worn by different persons. The compilation or collection of data and information in device memory or database storage ((i.e., worker IDs, PPE item IDs, transceiver IDs, RSSI thresholds, gateway IDs, location information, task information, access authorization credentials, contact information for notices and alerts, etc.) is also presumed in as a preparatory step to provide the desired functionality of the system Also preparatory to the method or process illustrated in FIG. 12, the intelligent PPE items are made available for use by workers.

At step 402 the appropriate PPE items are selected for use by workers for performing tasks in any of the traditional or non-traditional hazardous areas described above. The PPE items selected may include a headband and faceshield as described above in the assembly 100 and 200 and/or any other PPE items described above that include embedded sensor components that are operable to provide similar functionality.

At step 404 the PPE items selected at step 402 are worn by the respective workers as they attend to tasks in the environment and locations being monitored by the system 100. In general, each monitored worker should select and wear at least one intelligent PPE item of the type described above. In some embodiments, individual workers may select and wear multiple intelligent PPE items to provide further redundancy and enhancement in detecting or confirming events of interest to the monitoring system. As described above, unique IDs of the intelligent PPE items may be correlated with unique IDs of workers to provide positive identification of events or confirmations with respect to specific workers or to generate notices and alerts with positive identification of affected workers.

While steps 402, 404 are performed by workers (i.e., human persons) the remaining steps of the process 400 are automated and are performed by the devices and systems described above across a plurality of monitored workers that have selected and are wearing the PPE items. The system 100 and process 400 are scalable to reliably monitor any number of workers performing tasks in the same location or different locations. The method steps described below may be implemented algorithmically in the pertinent devices of the system described above.

At step 406, the sensors are powered on and are operated while the PPE items are being worn by workers. As such, the biometric parameters and movements described above are detected by the sensors with respect to each working wearing one of the intelligent PPE items. As such, the sensors are simultaneously operable with respect to each worker wearing an intelligent PPE items for both individual and group assessment by the system.

At step 408, the sensor outputs are considered individually and collectively to determine events of interest to the system 100 for the workers being monitored that are wearing the PPE items including the sensors as described above or additional sensors that are communicating with one of the PPE items being worn. Information exchanged between the transceivers of different sensor units for PPE items being worn by different persons can also be considered in interpreting sensor outputs or in detecting certain events of interest. In certain contemplated embodiments, the sensor outputs (including an optional interpretation of the outputs) and any other pertinent information can be communicated from the processor-based controls of the sensor units embedded in the PPE items as described above as data outputs as shown at step 410.

Alternatively, in other contemplated embodiments, and as also shown in FIG. 12, the sensor outputs and any other pertinent information can be communicated as data before being interpreted at step 408 by a separate device (e.g., the server 130 shown in FIG. 1) which may be remote from the monitored workers and the sensor units. In such a case, the sensor units embedded in the PPE items being worn may communicate with a gateway device 120, which in turn communicates the sensor data to the remote device for analysis and interpretation.

The nature and redundancy of the combinations of sensors in the sensor units described above allow a number of interpretations and conclusions to be reliably and intelligently made by the system via comparison of sensor outputs to detect various different events of interest. Such detections include as shown: a detection 412 of a worker in an improper or unauthorized area of the monitored environment; a detection 414 of a sensor error; a detection of an unwell worker 414 including a worker suffering from illness or sickness or workers needing assistance because of fainting, falling, etc. or showing unusual or unexpected movements or no movement; a detection 418 of a proximity violation (e.g., two or more workers that are not distanced from one another by at least a predetermined amount); a detection 420 of a specific position of a PPE item for a PPE item that is usable in more than one position (e.g., the up or down position of a faceshield) and wherein the detected position is improper for the task being performed; a detection 422 of a mismatched PPE item (i.e., a PPE item of the wrong level or grade for the task being performed or the risks presented in the environment, which may or may not relate to the level or grade of PPE items that the other workers are wearing; a detection 424 of required workers needed to perform a task per the applicable protocol, including detection of missing workers for the task being performed; and a detection 426 of a PPE item that is not being worn (or not properly being worn). Specific examples, scenarios and variations of the types of detections 412, 414, 416, 418, 420, 422, 424 and 426 are described above in some detail. Combinations of the detections shown and described are possible when the corresponding conditions simultaneously exist.

In the case of the detection 426 of the PPE item(s) not being worn, the processor-based controls and the sensors can be powered down as shown at step 428 to a low power consumption mode, sometimes referred to as a sleep state to conserve battery power, which can be deactivated once the worker picks the PPE item back up and wears it once again. Likewise, as shown at step 430 the battery is monitored (e.g., the battery charge is monitored) to ensure a sufficient operating power. If battery power reaches a critical, predetermined level at step 430 or if a non-worn device is powered down, a notification may be generated and sent by the system as shown at step 432 in any manner described above or as known in the art. Notifications at step 432 may also be provided for any of the detections 412, 414, 416, 418, 420, 422, and 424. When multiple of the detections are simultaneously made, multiple notifications are sent for affected workers.

As shown at step 434, feedback is provided to the workers via the feedback elements described above that are integrated into the PPE items. The feedback elements in each PPE item may be activated by the processor-based controls when certain events are detected, and such activation may be observed by other workers for confirmatory status of the respective worker as well or unwell, to indicate noncompliance issues (e.g., a proximity violation), to identify a worker that is not sufficiently protected, etc. Appropriate steps can therefore be taken by other workers to address an unwell worker or to mitigate noncompliance with protocols. Workers can therefore perform tasks in groups or as individuals with higher degrees of situational awareness of events that are otherwise extremely difficult for the workers to possess, as well as provide a higher assurance of safety from hazards while performing tasks. Because notices are generated at step 432 in addition to feedback at step 434, a notice may be directed to an unwell worker or a worker that is not in compliance without necessarily being reliant upon other workers to tell them that they are unwell or are not in compliance based on observation of the feedback elements. Of course, it is possible that multiple feedback elements may be provided in the PPE items, some of which are geared to signaling to other workers of detected conditions and some of which are geared to signaling to the person wearing the PPE item of a detected condition.

As shown at step 436, dashboard displays are generated based on the communicated data to allow workers and/or overseers to assess PPE protocol appliance and wellness issues in an intuitive and user friendly manner in graphical form in varying levels of detail. The dashboard displays can be accessed by any of the devices described above as non-limiting examples.

As shown at step 438 detailed wellness and compliance reports may be generated for study of the effectiveness of PPE protocols and also the system itself. Troubleshooting and optimizing of the PPE protocols and the system operation are therefore possible.

The algorithmic processes and associated functionality described above can be implemented in application software running on the processor-based devices and computing devices described herein. The PPE compliance and wellness monitoring systems and processes of the invention, as described above for an electrical power system or another industrial environment or in any setting described above that are traditionally or non-traditionally considered hazardous for personnel may further be implemented in multiple components distributed among a plurality of sensing devices, gateway devices, server devices and computing devices. One or more components may be in the form of computer-executable instructions embodied in a computer-readable medium. The systems and processes are not limited to the specific embodiments described herein, however. In addition, components of each device, each system, and each process can be practiced independently and separately from other components and processes described herein. Each component and process can also be used, however, in combination with other devices, systems and processes as desired.

The above-described examples of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the described embodiments above. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

Having described devices and applicable operating algorithms functionally per the description above, those in the art may accordingly implement the algorithms via programming of the controllers or other processor-based devices. Such programming or implementation of the concepts described is believed to be within the purview of those in the art and will not be described further.

The benefits and advantages of the inventive concepts are now believed to have been amply illustrated in relation to the exemplary embodiments disclosed.

An embodiment of a personal protective equipment compliance and personal wellness monitoring system has been disclosed including a plurality of intelligent wearable personal protective equipment items for respectively different workers. The plurality of intelligent wearable personal protective equipment items for each worker are selected from a group consisting of a head covering, a face covering, a neck protector, an ear protector, a protective garment, a glove, and a footwear item. At least one of the plurality of intelligent wearable personal protective equipment items worn be each worker includes a battery, a processor receiver power from the battery, and a combination of sensors embedded in the intelligent wearable personal protective equipment item and communicating with the processor, and a communication element for communicating data from the combination of sensors with a remote computing device. The combination of sensors includes an oximeter sensor, an infrared thermopile sensor, and an inertial measurement unit. At least one of the processor and the remote computing device is configured to, with respect to one or more of the output data from the combination of sensors, detect a plurality of events including: an improper location of a worker, a sensor error, an unwell worker, a proximity violation of a worker, an operable position of the personal protective item, an improper grade of personal protective equipment, a non-worn personal protective equipment item, and a missing worker.

Optionally, the at least one of the plurality of intelligent wearable personal protective equipment items may also include at least one feedback element. The at least one feedback element may be a light emitting element. The communication element may include a transmitter, and more specifically may be a Bluetooth transceiver. The processor may be configured to determine a proximity violation of a first and second worker based upon a received signal strength indication of the Bluetooth transceiver. The system may also include a gateway device receiving sensor output data from the transmitter, and the remote computer device may be a computer server device in communication with the gateway device.

As further options, the at least one of the plurality of intelligent wearable personal protective equipment items may include a headband, which may further include a faceshield. The processor may be configured to determine a position of the faceshield based upon the sensor outputs. The headband may include an undulating profile. The headband may include integrated wire channels to facilitate interconnections of the combination of sensors, the processor, and/or the battery. The headband may also include at least one foam insert. The headband may include an adjustable strap, and more specifically may include a front section and side sections interconnected by the adjustable strap.

The at least one of the plurality of intelligent wearable personal protective equipment items may also be thermally insulated. The system may also include an electromagnetic field sensor. At least one of the processor and the remote computing device may be configured to generate a notification for detected events. The processor may be configured to assume a low power sleep state when the intelligent personal protection equipment item is not being worn.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A personal protective equipment compliance and personal wellness monitoring system comprising:

a plurality of intelligent wearable personal protective equipment items for respectively different workers, the plurality of intelligent wearable personal protective equipment items for each worker being selected from a group consisting of a head covering, a face covering, a neck protector, an ear protector, a protective garment, a glove, and a footwear item;

wherein at least one of the plurality of intelligent wearable personal protective equipment items worn be each worker comprises:

a battery;

a processor receiver power from the battery;

a combination of sensors embedded in the intelligent wearable personal protective equipment item and communicating with the processor, wherein the combination of sensors includes an oximeter sensor, an infrared thermopile sensor, and an inertial measurement unit; and a communication element for communicating output data from the combination of sensors with a remote computing device;

wherein at least one of the processor and the remote computing device is configured to, with respect to one or more of the output data from the combination of sensors, detect a plurality of events including: an improper location of a worker, a sensor error, an unwell worker, a proximity violation of a worker, an operable position of the personal protective item, an improper grade of personal protective equipment, a non-worn personal protective equipment item, and a missing worker.

2. The system of claim 1, wherein the at least one of the plurality of intelligent wearable personal protective equipment items further comprises at least one feedback element.

3. The system of claim 2, wherein the at least one feedback element is a light emitting element.

4. The system of claim 1, wherein the communication element comprises a transmitter.

5. The system of claim 4, wherein the communication element is a Bluetooth transceiver.

6. The system of claim 5, wherein the processor is configured to determine a proximity violation of a first and second worker based upon a received signal strength indication of the Bluetooth transceiver.

7. The system of claim 4, further comprising a gateway device receiving sensor output data from the transmitter.

8. The system of claim 7, wherein the remote computer device is a computer server device in communication with the gateway device.

9. The system of claim 1, wherein the at least one of the plurality of intelligent wearable personal protective equipment items comprises a headband.

10. The system of claim 9, wherein the at least one of the plurality of intelligent wearable personal protective equipment items further comprises a faceshield.

11. The system of claim 10, wherein the processor is configured to determine a position of the faceshield based upon the sensor outputs.

12. The system of claim 9, wherein the headband includes an undulating profile.

13. The system of claim 12, wherein the headband includes integrated wire channels to facilitate interconnections of the combination of sensors, the processor, and/or the battery.

14. The system of claim 13, wherein the headband includes at least one foam insert.

15. The system of claim 9, wherein the headband includes an adjustable strap.

16. The system of claim 15, wherein the headband comprises a front section and side sections interconnected by the adjustable strap.

17. The system of claim 1, wherein the at least one of the plurality of intelligent wearable personal protective equipment items is thermally insulated.

18. The system of claim 17, further comprising an electromagnetic field sensor.

19. The system of claim 1, wherein at least one of the processor and the computing device is configured to generate a notification for detected events.

20. The system of claim 1, wherein the processor is configured to assume a low power sleep state when the intelligent personal protection equipment item is not being worn.

* * * * *